US006518477B2

(12) United States Patent
Soundararajan

(10) Patent No.: US 6,518,477 B2
(45) Date of Patent: Feb. 11, 2003

(54) SIMPLIFIED INTEGRATED IMMOBILIZATION PROCESS FOR THE REMEDIATION OF RADIOACTIVE WASTE

(75) Inventor: Rengarajan Soundararajan, West Plains, MO (US)

(73) Assignee: Hanford Nuclear Services, Inc., West Plains, MO (US)

( * ) Notice: Subject to any disclaimer, the term of this patent is extended or adjusted under 35 U.S.C. 154(b) by 11 days.

(21) Appl. No.: 09/841,791

(22) Filed: Apr. 24, 2001

(65) Prior Publication Data

US 2002/0010381 A1 Jan. 24, 2002

Related U.S. Application Data

(60) Provisional application No. 60/210,393, filed on Jun. 9, 2000.

(51) Int. Cl.[7] .................................................. G21F 9/32
(52) U.S. Cl. ............................ 588/6; 588/11; 588/12; 588/14; 588/19; 588/234; 588/255; 588/256
(58) Field of Search .................................. 110/235, 237, 110/346; 588/1, 2, 6, 8, 10, 11, 12, 14, 18, 19, 20, 231, 234, 236, 249, 251, 252, 255, 256

(56) References Cited

U.S. PATENT DOCUMENTS

| 3,949,026 | A | | 4/1976 | Devillard |
| 4,092,398 | A | | 5/1978 | Miyake et al. |
| 4,591,455 | A | | 5/1986 | Macedo et al. |
| 4,628,837 | A | * | 12/1986 | Mori et al. .................. 110/210 |
| 4,636,335 | A | * | 1/1987 | Kawamura et al. ......... 110/237 |
| 4,654,172 | A | * | 3/1987 | Matsuda et al. ............ 110/237 |
| 4,816,187 | A | | 3/1989 | Larson et al. |
| 4,959,181 | A | | 9/1990 | White et al. |
| 5,401,824 | A | | 3/1995 | Clatty et al. |
| 5,545,796 | A | | 8/1996 | Roy et al. |
| 5,786,611 | A | | 7/1998 | Quapp et al. |
| 5,789,648 | A | | 8/1998 | Roy et al. |
| 6,030,549 | A | | 2/2000 | Kalb et al. |

* cited by examiner

Primary Examiner—Stanley S. Silverman
Assistant Examiner—Eileen E. Nave
(74) Attorney, Agent, or Firm—Blackwell Sanders Peper Martin LLP

(57) ABSTRACT

A method for remediating non-homogeneous radioactive waste to significantly reduce the waste mass/volume and to convert such waste to products that meet federal regulatory compliance standards is disclosed. High level waste (HLW) stored in underground tanks is typically a multi component mixture. After removal of the waste from the tanks or other storage areas the waste is isolated in a thermal desorption-type reaction vessel where the waste is pyrolized at predetermined and carefully controlled temperatures, pressures, and atmospheres. This process eliminates organics, volatile metals, moisture and other low boiling temperature/high vapor pressure components and converts non-volatile waste to more stable metal oxides. Off-gas treatment systems scrub, treat and dispose of all off-gas components. A thermal desorption-type apparatus especially well suited for performing the method of the present invention is also disclosed.

32 Claims, 12 Drawing Sheets

FIG. 3
Table 1

MASS AND VOLUME REDUCTION
DURING THE IMMOBILIZATION OF HLW SIMULANTS

Clear Liquid from HLW Solution)

Volume reduction (at 105° C) = 81.0%

Mass reduction (at 105°C) = 82.2%

---

Heavy Sludge from HLW)

Volume reduction of Heavy Sludge from HLW Simulant (at 105°C) = 75.7%

Mass Reduction of Heavy Sludge from HLW Simulant (at 105°C) = 75.9%

Volume Reduction of HLW Simulant after Pyrolysis (900°C) = 84.7%

Mass Reduction of HLW Simulant after Pyrolysis (900°C) = 83.8%

FIG. 4
Table 2

MASS AND VOLUME REDUCTION
DURING THE IMMOBILIZATION OF LAW SIMULANTS

Clear Liquid from LAW Solution)

Volume reduction (at 105° C) = 96.4%

Mass reduction (at 105°C) = 82.0%

Heavy Sludge from LAW)

Volume reduction of Heavy Sludge) = 68.0%
from LAW Simulant (at 105°C)

Mass Reduction of Heavy Sludge = 71.9%
from LAW Simulant (at 105°C)

Volume Reduction of LAW Simulant = 81.0%
after Pyrolysis (900°C)

Mass Reduction of LAW Simulant = 84.3%
after Pyrolysis (900°C)

FIG. 5
Table 3
LAW SIMULANT
ANS16.1 LEACH DATA FROM CESIUM & STRONTIUM RESIDUE WITH POLYMER
(Residue to Polymer is 84:16 By Weight)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Ag | 6000 | *** | *** | *** | *** | *** | *** | *** | *** |
| Al | 273,000 | *** | *** | *** | *** | *** | *** | *** | *** |
| Ba | 1,700 | *** | *** | *** | *** | *** | *** | *** | *** |
| Ca | 18,100 | *** | *** | *** | *** | *** | *** | *** | *** |
| Cd | 1,100 | *** | *** | *** | *** | *** | *** | *** | *** |
| Ce | 800 | *** | *** | *** | *** | *** | *** | *** | *** |
| Cr | 4,100 | *** | *** | *** | *** | *** | *** | *** | *** |
| Cs | 100 | *** | *** | *** | *** | *** | *** | *** | *** |
| Cu | 400 | *** | *** | *** | *** | *** | *** | *** | *** |
| F | 400 | *** | *** | *** | *** | *** | *** | *** | *** |
| Fe | 297,400 | *** | *** | *** | *** | *** | *** | *** | *** |
| Hg | 100 | *** | *** | *** | *** | *** | *** | *** | *** |
| K | 700 | *** | *** | *** | *** | *** | *** | *** | *** |
| La | 2,800 | *** | *** | *** | *** | *** | *** | *** | *** |
| Mg | 5,600 | *** | *** | *** | *** | *** | *** | *** | *** |
| Mn | 13,600 | *** | *** | *** | *** | *** | *** | *** | *** |
| Na | 206,100 | *** | *** | *** | *** | *** | *** | *** | *** |
| Ni | 3,900 | *** | *** | *** | *** | *** | *** | *** | *** |
| P | 3,800 | *** | *** | *** | *** | *** | *** | *** | *** |
| Pb | 5,500 | *** | *** | *** | *** | *** | *** | *** | *** |
| Pd | 100 | *** | *** | *** | *** | *** | *** | *** | *** |
| S | 200 | *** | *** | *** | *** | *** | *** | *** | *** |
| Si | 149,300 | *** | *** | *** | *** | *** | *** | *** | *** |
| Sr | 500 | *** | *** | *** | *** | *** | *** | *** | *** |
| Ti | 1000 | *** | *** | *** | *** | *** | *** | *** | *** |
| Zn | 400 | *** | *** | *** | *** | *** | *** | *** | *** |
| Zr | 2,900 | *** | *** | *** | *** | *** | *** | *** | *** |

(*** Non-detected)

FIG. 6
Table 4
LAW SIMULANT
ANS16.1 LEACH DATA FROM ION-EXCHANGED ZEOLITE
(Zeolite to Polymer is 84:16 By Weight)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Ag | 6000 | *** | *** | *** | *** | *** | *** | *** | *** |
| Al | 273,000 | *** | *** | *** | *** | *** | *** | *** | *** |
| Ba | 1,700 | *** | *** | *** | *** | *** | *** | *** | *** |
| Ca | 18,100 | *** | *** | *** | *** | *** | *** | *** | *** |
| Cd | 1,100 | *** | *** | *** | *** | *** | *** | *** | *** |
| Ce | 800 | *** | *** | *** | *** | *** | *** | *** | *** |
| Cr | 4,100 | *** | *** | *** | *** | *** | *** | *** | *** |
| Cs | 100 | *** | *** | *** | *** | *** | *** | *** | *** |
| Cu | 400 | *** | *** | *** | *** | *** | *** | *** | *** |
| F | 400 | *** | *** | *** | *** | *** | *** | *** | *** |
| Fe | 297,400 | *** | *** | *** | *** | *** | *** | *** | *** |
| Hg | 100 | *** | *** | *** | *** | *** | *** | *** | *** |
| K | 700 | *** | *** | *** | *** | *** | *** | *** | *** |
| La | 2,800 | *** | *** | *** | *** | *** | *** | *** | *** |
| Mg | 5,600 | *** | *** | *** | *** | *** | *** | *** | *** |
| Mn | 13,600 | *** | *** | *** | *** | *** | *** | *** | *** |
| Na | 206,100 | *** | *** | *** | *** | *** | *** | *** | *** |
| Ni | 3,900 | *** | *** | *** | *** | *** | *** | *** | *** |
| P | 3,800 | *** | *** | *** | *** | *** | *** | *** | *** |
| Pb | 5,500 | *** | *** | *** | *** | *** | *** | *** | *** |
| Pd | 100 | *** | *** | *** | *** | *** | *** | *** | *** |
| S | 200 | *** | *** | *** | *** | *** | *** | *** | *** |
| Si | 149,300 | *** | *** | *** | *** | *** | *** | *** | *** |
| Sr | 500 | *** | *** | *** | *** | *** | *** | *** | *** |
| Ti | 1000 | *** | *** | *** | *** | *** | *** | *** | *** |
| Zn | 400 | *** | *** | *** | *** | *** | *** | *** | *** |
| Zr | 2,900 | *** | *** | *** | *** | *** | *** | *** | *** |

(*** Non-detected)

FIG. 7
Table 5
ANS 16.1 LEACH DATA FROM CESIUM AND STRONTIUM RESIDUE WITH POLYMER
Residue with Polymer (Residue to Polymer is 84:16)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Mn | 8283.0 | *** | *** | *** | *** | *** | *** | *** | *** |
| Ni | 290.0 | *** | *** | *** | *** | *** | *** | *** | *** |
| SO$_4$ | 35.0 | *** | *** | *** | *** | *** | *** | *** | *** |
| K | 51.0 | *** | *** | *** | *** | *** | *** | *** | *** |
| Ag | 84.0 | *** | *** | *** | *** | *** | *** | *** | *** |
| Fe | 291.0 | *** | *** | *** | *** | *** | *** | *** | *** |
| F | 62.0 | *** | *** | *** | *** | *** | *** | *** | *** |
| Cl | 62.0 | *** | *** | *** | *** | *** | *** | *** | *** |
| Cd | 97.0 | *** | *** | *** | *** | *** | *** | *** | *** |
| Ba | 184.0 | *** | *** | *** | *** | *** | *** | *** | *** |
| Ce | 60.0 | *** | *** | *** | *** | *** | *** | *** | *** |
| La | 230.0 | *** | *** | *** | *** | *** | *** | *** | *** |
| Cs | 465.0 | 35.0 | 31.9 | 23.3 | 0.44 | *** | *** | *** | *** |
| Cr | 269.0 | *** | *** | *** | *** | *** | *** | *** | *** |
| Na | 16,000.0 | *** | *** | *** | *** | *** | *** | *** | *** |
| Pb | 478.0 | *** | *** | *** | *** | *** | *** | *** | *** |
| NO$_3$ | 915.0 | *** | *** | *** | *** | *** | *** | *** | *** |
| NO$_2$ | 206.0 | *** | *** | *** | *** | *** | *** | *** | *** |
| Ti | 59.0 | *** | *** | *** | *** | *** | *** | *** | *** |
| CO$_3$ | 8,400 | *** | *** | *** | *** | *** | *** | *** | *** |
| Zr | 209.0 | *** | *** | *** | *** | *** | *** | *** | *** |
| Ca | 1230.0 | *** | *** | *** | *** | *** | *** | *** | *** |
| Mg | 973.0 | *** | *** | *** | *** | *** | *** | *** | *** |
| Sr | 16,500.0 | *** | *** | *** | *** | *** | *** | *** | *** |
| Al | 82,600.0 | *** | *** | *** | *** | *** | *** | *** | *** |
| Si | 6630.0 | *** | *** | *** | *** | *** | *** | *** | *** |
| C$_2$H$_2$O$_4$·2H$_2$O | 5658.0 | *** | *** | *** | *** | *** | *** | *** | *** |

(*** Non-detected)

FIG. 8
Table 6
LAW SIMULANT
ANS16.1 LEACH DATA FROM BOROSILICATE GLASS MADE WITH METAL OXIDES
(Residue to Glass Components is 84:16 By Weight)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Ag | 6000 | *** | *** | *** | *** | *** | *** | *** | *** |
| Al | 273,000 | 57 | 74 | 103 | 86 | 72 | 47 | 45 | 30 |
| Ba | 1,700 | *** | *** | *** | *** | *** | *** | *** | *** |
| Ca | 18,100 | *** | *** | *** | *** | *** | *** | *** | *** |
| Cd | 1,100 | *** | *** | *** | *** | *** | *** | *** | *** |
| Ce | 800 | *** | *** | *** | *** | *** | *** | *** | *** |
| Cr | 4,100 | *** | *** | *** | *** | *** | *** | *** | *** |
| Cs | 100 | *** | *** | *** | *** | *** | *** | *** | *** |
| Cu | 400 | *** | *** | *** | *** | *** | *** | *** | *** |
| F | 400 | *** | *** | *** | *** | *** | *** | *** | *** |
| Fe | 297,400 | *** | *** | *** | *** | *** | *** | *** | *** |
| Hg | 100 | *** | *** | *** | *** | *** | *** | *** | *** |
| K | 700 | *** | *** | *** | *** | *** | *** | *** | *** |
| La | 2,800 | *** | *** | *** | *** | *** | *** | *** | *** |
| Mg | 5,600 | *** | *** | *** | *** | *** | *** | *** | *** |
| Mn | 13,600 | *** | *** | *** | *** | *** | *** | *** | *** |
| Na | 206,100 | *** | *** | *** | *** | *** | *** | *** | *** |
| Ni | 3,900 | *** | *** | *** | *** | *** | *** | *** | *** |
| P | 3,800 | *** | *** | *** | *** | *** | *** | *** | *** |
| Pb | 5,500 | *** | *** | *** | *** | *** | *** | *** | *** |
| Pd | 100 | *** | *** | *** | *** | *** | *** | *** | *** |
| S | 200 | *** | *** | *** | *** | *** | *** | *** | *** |
| Si | 149,300 | *** | *** | *** | *** | *** | *** | *** | *** |
| Sr | 500 | *** | *** | *** | *** | *** | *** | *** | *** |
| Ti | 1000 | *** | *** | *** | *** | *** | *** | *** | *** |
| Zn | 400 | 20 | 34 | 36 | 20 | 10 | *** | *** | *** |
| Zr | 2,900 | *** | *** | *** | *** | *** | *** | *** | *** |

(*** Non-detected)

FIG. 9
Table 7
HLW SIMULANT
ANSI6.1 LEACH DATA FROM CESIUM & STRONTIUM RESIDUE WITH POLYMER
(Residue to Polymer is 84:16)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Mn | 8283.0 | *** | *** | *** | *** | *** | *** | *** | *** |
| Ni | 290.0 | *** | *** | *** | *** | *** | *** | *** | *** |
| $SO_4$ | 35.0 | *** | *** | *** | *** | *** | *** | *** | *** |
| K | 51.0 | *** | *** | *** | *** | *** | *** | *** | *** |
| Ag | 84.0 | *** | *** | *** | *** | *** | *** | *** | *** |
| Fe | 291.0 | *** | *** | *** | *** | *** | *** | *** | *** |
| F | 62.0 | *** | *** | *** | *** | *** | *** | *** | *** |
| Cl | 62.0 | *** | *** | *** | *** | *** | *** | *** | *** |
| Cd | 97.0 | *** | *** | *** | *** | *** | *** | *** | *** |
| Ba | 184.0 | *** | *** | *** | *** | *** | *** | *** | *** |
| Ce | 60.0 | *** | *** | *** | *** | *** | *** | *** | *** |
| La | 230.0 | *** | *** | *** | *** | *** | *** | *** | *** |
| Cs | 465.0 | *** | *** | *** | *** | *** | *** | *** | *** |
| Cr | 269.0 | *** | *** | *** | *** | *** | *** | *** | *** |
| Na | 16,000.0 | *** | *** | *** | *** | *** | *** | *** | *** |
| Pb | 478.0 | *** | *** | *** | *** | *** | *** | *** | *** |
| $NO_3$ | 915.0 | *** | *** | *** | *** | *** | *** | *** | *** |
| $NO_2$ | 206.0 | *** | *** | *** | *** | *** | *** | *** | *** |
| Ti | 59.0 | *** | *** | *** | *** | *** | *** | *** | *** |
| $CO_2$ | 8,400 | *** | *** | *** | *** | *** | *** | *** | *** |
| Zr | 209.0 | *** | *** | *** | *** | *** | *** | *** | *** |
| Ca | 1230.0 | *** | *** | *** | *** | *** | *** | *** | *** |
| Mg | 973.0 | *** | *** | *** | *** | *** | *** | *** | *** |
| Sr | 16,500.0 | *** | *** | *** | *** | *** | *** | *** | *** |
| Al | 82,600.0 | *** | *** | *** | *** | *** | *** | *** | *** |
| Si | 6630.0 | *** | *** | *** | *** | *** | *** | *** | *** |
| $C_2H_2O_4 \cdot 2H_2O$ | 5658.0 | *** | *** | *** | *** | *** | *** | *** | *** |

(*** Non-detected)

FIG. 10
Table 8
HLW SIMULANT
ANSI6.1 LEACH DATA FROM ION-EXCHANGED ZEOLITE POLYMER
Residue with Polymer (Zeolite to Polymer is 84:16)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Mn | 8283.0 | *** | *** | *** | *** | *** | *** | *** | *** |
| Ni | 290.0 | *** | *** | *** | *** | *** | *** | *** | *** |
| $SO_4$ | 35.0 | *** | *** | *** | *** | *** | *** | *** | *** |
| K | 51.0 | *** | *** | *** | *** | *** | *** | *** | *** |
| Ag | 84.0 | *** | *** | *** | *** | *** | *** | *** | *** |
| Fe | 291.0 | *** | *** | *** | *** | *** | *** | *** | *** |
| F | 62.0 | *** | *** | *** | *** | *** | *** | *** | *** |
| Cl | 62.0 | *** | *** | *** | *** | *** | *** | *** | *** |
| Cd | 97.0 | *** | *** | *** | *** | *** | *** | *** | *** |
| Ba | 184.0 | *** | *** | *** | *** | *** | *** | *** | *** |
| Ce | 60.0 | *** | *** | *** | *** | *** | *** | *** | *** |
| La | 230.0 | *** | *** | *** | *** | *** | *** | *** | *** |
| Cs | 465.0 | *** | *** | *** | *** | *** | *** | *** | *** |
| Cr | 269.0 | *** | *** | *** | *** | *** | *** | *** | *** |
| Na | 16,000.0 | *** | *** | *** | *** | *** | *** | *** | *** |
| Pb | 478.0 | *** | *** | *** | *** | *** | *** | *** | *** |
| $NO_3$ | 915.0 | *** | *** | *** | *** | *** | *** | *** | *** |
| $NO_2$ | 206.0 | *** | *** | *** | *** | *** | *** | *** | *** |
| Ti | 59.0 | *** | *** | *** | *** | *** | *** | *** | *** |
| $CO_3$ | 8,400 | *** | *** | *** | *** | *** | *** | *** | *** |
| Zr | 209.0 | *** | *** | *** | *** | *** | *** | *** | *** |
| Ca | 1230.0 | *** | *** | *** | *** | *** | *** | *** | *** |
| Mg | 973.0 | *** | *** | *** | *** | *** | *** | *** | *** |
| Sr | 16,500.0 | *** | *** | *** | *** | *** | *** | *** | *** |
| Al | 82,600.0 | *** | *** | *** | *** | *** | *** | *** | *** |
| Si | 6630.0 | *** | *** | *** | *** | *** | *** | *** | *** |
| $C_2H_2O_4 \cdot 2H_2O$ | 5658.0 | *** | *** | *** | *** | *** | *** | *** | *** |

(*** Non-detected)

FIG. 11
Table 9
HLW SIMULANT
ANS16.1 LEACH DATA FROM BOROSILICATE GLASS MADE WITH METAL OXIDES
Residue with Glass Components (Residue to Glass Components is 84:16)

| Run No. | | I | II | III | IV | V | VI | VII | VIII |
|---|---|---|---|---|---|---|---|---|---|
| Element | PPM | 24hrs | 48 hrs | 72 hrs | 120 hrs | 168 hrs | 336 hrs | 504hrs | 672 hrs |
| Mn | 8283.0 | *** | *** | *** | *** | *** | *** | *** | *** |
| Ni | 290.0 | *** | *** | *** | *** | *** | *** | *** | *** |
| $SO_4$ | 35.0 | *** | *** | *** | *** | *** | *** | *** | *** |
| K | 51.0 | *** | *** | *** | *** | *** | *** | *** | *** |
| Ag | 84.0 | *** | *** | *** | *** | *** | *** | *** | *** |
| Fe | 291.0 | *** | *** | *** | *** | *** | *** | *** | *** |
| F | 62.0 | *** | *** | *** | *** | *** | *** | *** | *** |
| Cl | 62.0 | *** | *** | *** | *** | *** | *** | *** | *** |
| Cd | 97.0 | *** | *** | *** | *** | *** | *** | *** | *** |
| Ba | 184.0 | *** | *** | *** | *** | *** | *** | *** | *** |
| Ce | 60.0 | *** | *** | *** | *** | *** | *** | *** | *** |
| La | 230.0 | *** | *** | *** | *** | *** | *** | *** | *** |
| Cs | 465.0 | *** | *** | *** | *** | *** | *** | *** | *** |
| Cr | 269.0 | *** | *** | *** | *** | *** | *** | *** | *** |
| Na | 16,000.0 | *** | *** | *** | *** | *** | *** | *** | *** |
| Pb | 478.0 | *** | *** | *** | *** | *** | *** | *** | *** |
| $NO_3$ | 915.0 | *** | *** | *** | *** | *** | *** | *** | *** |
| $NO_2$ | 206.0 | *** | *** | *** | *** | *** | *** | *** | *** |
| Ti | 59.0 | *** | *** | *** | *** | *** | *** | *** | *** |
| $CO_3$ | 8,400 | *** | *** | *** | *** | *** | *** | *** | *** |
| Zr | 209.0 | *** | *** | *** | *** | *** | *** | *** | *** |
| Ca | 1230.0 | 124 | 240 | 180 | 220 | 190 | 70 | 43 | 38 |
| Mg | 973.0 | *** | *** | *** | *** | *** | *** | *** | *** |
| Sr | 16,500.0 | *** | *** | *** | *** | *** | *** | *** | *** |
| Al | 82,600.0 | *** | *** | *** | *** | *** | *** | *** | *** |
| Si | 6630.0 | *** | *** | *** | *** | *** | *** | *** | *** |
| $C_2H_2O_4 \cdot 2H_2O$ | 5658.0 | *** | *** | *** | *** | *** | *** | *** | *** |

(*** Non-detected)

US 6,518,477 B2

SIMPLIFIED INTEGRATED IMMOBILIZATION PROCESS FOR THE REMEDIATION OF RADIOACTIVE WASTE

This application claims the benefit of U.S. Provisional Application Ser. No. 60/210,393 filed Jun. 9, 2000.

FIELD OF THE INVENTION

The present invention relates generally to the remediation of radioactive waste and, more particularly, to the remediation of non-homogeneous radioactive tank waste to greatly reduce the waste volume and to produce end products which meet federal regulatory compliance standards for disposal. Millions of gallons of radioactive waste, the result of plutonium production, are currently buried in single-shell tanks that have exceeded their design life. The tremendous variety of components mixed in these tanks has complicated attempts at remediation of the waste. The remediation method of the present invention utilizes well-known, cost effective, EPA approved treatment processes to substantially reduce the mass/volume of the waste while resulting in end products that meet federal regulatory compliance standards. A thermal desorption-type apparatus adapted for effectively performing the method of the present invention is also disclosed.

BACKGROUND OF THE INVENTION

The production of plutonium for the nation's nuclear defense program has resulted in the storage of millions of gallons of multi-component radioactive waste. This waste is stored in underground tanks at several cites in the United States. Many of the tanks are older, single-shell tanks that have exceeded their design life by over three decades. It is believed that many of the tanks have leaked significant amounts of waste into the ground. The release of this waste may cause radionuclides to reach groundwater. Risks to the environment will increase as more radioactive waste is released from these tanks. A permanent solution, the immobilization of the waste so that the hazardous components of the waste cannot escape into the environment is required.

Conventional methods of remediating radioactive waste are ineffective for handling this waste due to the number of various components, both low activity and high activity, in these tanks. Further, the waste components can vary from tank to tank. Conventional methods are not easily adapted to handle out-of-specification wastes. Specifically, the presence of polychlorinated biphenyls (PCBs) often complicates processing. The detection of a variant in the waste often results in a complete overhaul of the waste management system, costing time and money.

Conventional methods are also often very expensive. In conventional radioactive waste immobilization processes, pretreatment steps, material handling, employee exposure to radiation, volume of waste generated and the complexity of the operation have major impacts on the cost of the process.

Finally, the complexity of the tank waste often leads to less than satisfactory disposal end products. Sodium aluminum silicate glass is conventionally utilized for storage of low activity waste (LAW) and borosilicate glass is conventionally utilized for storage of high level waste (HLW). Both of these disposal methods provide excellent products that meet federal regulatory compliance standards when the proper components are vitrified therein.

Unfortunately, even miniscule amounts of corresponding glass poisons greatly decrease the efficiency and effectiveness of these glasses. Borosilicate glass contaminates include sodium, phosphorus, iron, nickel, and chromium. Removal of these contaminates from the waste is necessary to ensure maximum insolubility to prevent leaching. Sodium aluminum silicate glass is compromised by large organic loadings, PCB's, fluorine, chlorine, and sulfur. Conventional methods of waste remediation do not provide satisfactory separation of the various components of the tank waste to prevent these contaminates from entering the melter.

It is therefore an object of the present invention to provide a radioactive waste remediation method that results in a significant reduction in the total volume and mass of waste which must be immobilized for disposal, thereby reducing disposal and storage costs.

It is a further object of the present invention to provide a method that allows the waste to be pumped straight from the tank, virtually free of any pretreatment steps, thereby reducing costs while minimizing handling and maximizing safety.

It is still a further object of the present invention to provide a method that uses proven industrial grade processes and results in improved separation of specific types of waste to facilitate treatment and disposal.

It is yet a further object of the present invention to provide a method that allows the virtual elimination of sodium from the waste stream prior to vitrification into borosilicate glass.

It is another object of the present invention to provide a method that is simplified and streamlined with a minimum number of steps and a minimum of additions to the waste, but allows for easy adaptation to variations in the tank waste components.

It is yet another object of the present invention to provide an apparatus that is especially well suited to perform the method of the present invention.

SUMMARY OF THE INVENTION

A method for remediating non-homogeneous radioactive waste to significantly reduce the waste mass/volume and to result in products that meet federal regulatory compliance standards is disclosed. The tank waste may include liquid and solid/sludge LAW as well as solid/sludge HLW. The HLW may include low boiling organic material, volatile metals, and heavy metal/transuranic components. In a preferred embodiment, the LAW liquids present in the tank are decanted from the LAW/HLW solids/sludge. The solid/sludge waste is isolated in a thermal desorption-type reaction vessel under reduced pressure and an inert atmosphere to limit or eliminate explosive reactions.

The thermal desorption is performed at a pre-determined and carefully controlled ramp of various combinations of temperatures and pressures. The heating ramp includes at least three distinct temperature phases. The first phase is a temperature necessary to vaporize the low boiling organic components, after which the vaporized organic components are removed from the reaction vessel for off-gas treatment prior to conventional disposal means.

The second phase in the predetermined heating ramp is a temperature necessary to vaporize the volatile metals, after which the vaporized volatile metals are removed from the reaction vessel for off-gas treatment. This treated waste can then be immobilized by conventional methods or by immobilizing in a radiation-shielding polymer.

In the third phase the temperature in the reaction vessel is raised to a temperature necessary to cause pyrolysis of the remaining waste, primarily heavy metal/transuranics. Pyrolysis results in the formation of gaseous nitrogen oxides and leaves a metal oxide ash residue. The gaseous nitrogen oxides are removed from the reaction vessel for off gas treatment and disposal.

The metal oxide ash is then removed from the reaction vessel for treatment. The following procedure for producing products that meet federal regulatory compliance standards is presently preferred. The metal oxides are washed with water to remove water-soluble metal oxides, including sodium, strontium, technetium and cesium. The LAW liquids that were previously decanted from the tank are then added to the wash solution for treatment.

The wash solution is then filtered to remove any solids. Carbon dioxide is then bubbled through the filtered wash solution to precipitate the strontium as strontium carbonate, and hydrazine hydrate is added to reduce any technetium that is present. The wash solution is then decanted from the precipitate, and the precipitate is added to the removed solids and dried for disposal by vitrification into borosilicate glass.

The sodium is removed from the wash solution by diafiltration and reverse osmosis. The sodium is then recovered by drying and is disposed of as sodium carbonate.

The cesium and technetium are then removed from the sodium free wash solution by utilizing a zeolite. The zeolite is dried and disposed of by vitrification into borosilicate glass.

Under this process, only 1/10 of the original volume or mass of waste ends up in glass or polymer. The balance has been converted into low-level waste and compounds that can be disposed of by conventional methods. Further, the purified stream of waste optimizes the life, performance and characteristics of the glass melter, and allows melter optimizations that have not previously been practical.

A preferred design for the thermal desorption-type apparatus is also disclosed. The apparatus includes a double walled reaction vessel having an aperture for introducing the waste into the reaction vessel. The apparatus includes a vacuum system to reduce the pressure within the reaction vessel, and further provides a venting system to provide an inert atmosphere in the reaction vessel to prevent explosive reactions. A temperature control system adapted to variably raise the temperature from room temperature to temperatures necessary to accomplish pyrolysis of the waste at reduced pressure is also provided. The temperature control system includes heating elements located between the walls of the double walled reaction vessel and temperature sensors located within the reaction vessel.

The presently preferred embodiment of the apparatus includes three gas fraction outlets for removing the three predominant gaseous fractions that are produced as the temperature in the reaction vessel is raised from room temperature to pyrolysis temperatures. In typical tank waste, these fractions include vaporized low boiling organic components, vaporized volatile metals, and nitrogen oxides produced by pyrolysis of heavy metal/transuranic waste.

The apparatus is preferably made of stainless steel and is shielded to prevent radiation leakage.

BRIEF DESCRIPTION OF THE DRAWINGS

For a better understanding of the present invention, reference may be made to the accompanying drawings.

FIG. 3 is Table 1 entitled Mass and Volume Reduction during the Immobilization of HLW Simulants.

FIG. 4 is Table 2 entitled Mass and Volume Reduction during the Immobilization of LAW Simulants.

FIG. 5 is Table 3 entitled LAW Simulant, ANS16.1 Leach Data from Cesium and Strontium Residue with Polymer.

FIG. 6 is Table 4 entitled LAW Simulant, ANS16.1 Leach Data from ion-exchanged zeolite.

FIG. 7 is Table 5 entitled HLW Simulant, ANS16.1 Leach Data Cesium and Strontium Residue with Polymer.

FIG. 8 is Table 6 entitled LAW Simulant, ANS16.1 Leach Data from borosilicate glass made with metal oxides.

FIG. 9 is Table 7 entitled HLW Simulant, ANS16.1 Leach Data from Cesium and Strontium Residue with Polymer.

FIG. 10 is Table 8 entitled HLW Simulant, ANS16.1 Leach Data from ion-exchanged zeolite polymer.

FIG. 11 is Table 9 entitled HLW Simulant, ANS16.1 Leach Data from Borosilicate Glass Made With Metal Oxides.

DETAILED DESCRIPTION OF THE INVENTION

Figure 1:
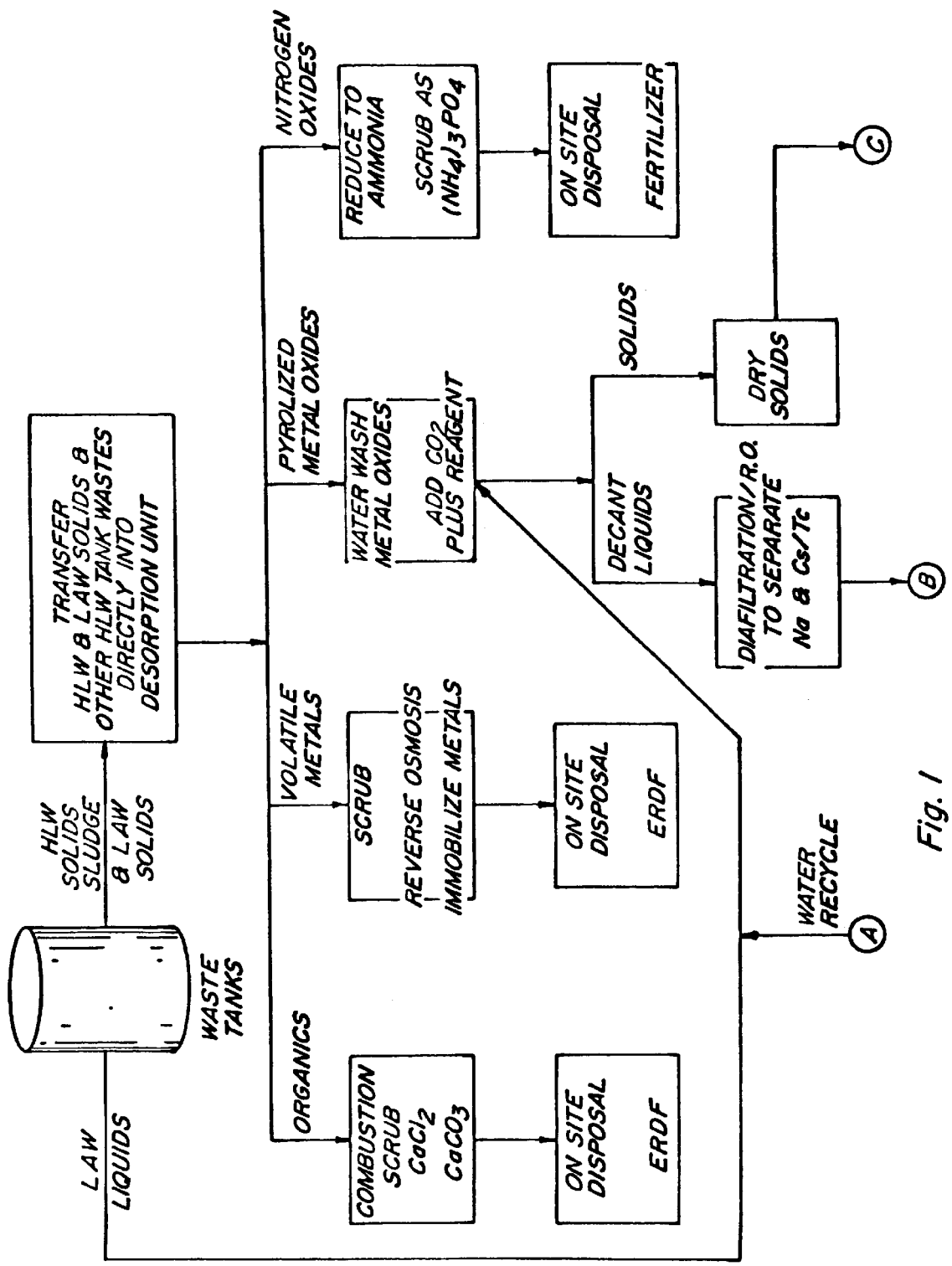
FIG. 1 and FIG. 1A are a flowchart illustrating a preferred embodiment of the method for remediating radioactive waste of the present invention.

The presently preferred method for remediating radioactive waste is illustrated in FIG. 1. The present invention is presently directed to non-homogeneous, multi-component waste typically stored in underground tanks. The tank waste may include liquid and solid/sludge low activity waste (LAW) as well as solid/sludge high level waste (HLW). The HLW may include low boiling organic material, volatile metals, and heavy metal/transuranic components. Due to the high levels of radiation generated by the HLW, the vitrification technology is required to be placed in shielded cells that isolate the waste from the operating staff. The operation and control of the system, replacement of instrumentation, manipulation of the waste, and any necessary maintenance are performed using robotic devices.

In a preferred embodiment, the waste is hydraulically removed from the tanks or other storage areas and the LAW liquids are decanted from the LAW/HLW solids/sludge. The solid/sludge waste is then isolated in a thermal desorption-type reaction vessel of the type disclosed herein.

The reaction vessel is then flushed with an inert gas to provide an inert atmosphere. Presently preferred is argon or helium, but any suitable inert gas may be utilized. The pressure in the reaction vessel is then reduced, preferably to about 0.1 atm. The inert atmosphere in combination with the reduced pressure act to limit or eliminate explosive reactions of the waste as the temperature is raised.

Removal of Organic Material

The temperature in the reaction vessel is then raised to a first temperature necessary to vaporize the low boiling organic components. The temperature is dependent on the specific components of the waste, but it is anticipated to be about 30–40° C. at 0.1 atm. This first temperature is maintained until essentially all of the organic material has been vaporized. The gaseous organic components are then removed from the reaction vessel for off-gas treatment.

The treatment of the gaseous organic components may be accomplished by any method that results in a product that meets federal regulatory compliance standards. Presently preferred is catalytically oxidizing the organic components to form carbon dioxide and hydrogen halides, and then scrubbing the carbon dioxide and hydrogen halides through sodium hydroxide to form sodium halide and sodium carbonate for on-site disposal in an Emergency Response Disposal Facility (ERDF) landfill.

Sample reactions for this step of the process follow:

$$C_xH_yCl \rightarrow xCO_2 + H_2O + HCl$$

$$3NaOH + HCl + CO_2 \rightarrow Na_2CO_3 + NaCl + 2H_2O$$

This initial temperature phase process reduces the total waste volume by about three percent, based on a typical tank waste composition.

Removal of Volatile Metals and Water

The temperature in the reaction vessel is then raised to a second temperature necessary to vaporize the volatile metals components, about 50–60° C. at 0.1 atm. This waste typically includes mercury, arsenic, selenium, and zinc. Any water in the waste will be vaporized at this time. The second temperature is maintained until essentially all of the volatile metals are vaporized. The gaseous volatile metals components are then removed from the reaction vessel for off-gas treatment. The water vapor containing the volatile metals is collected in a conventional condenser.

The treatment of the gaseous volatile metal components may be accomplished by any method that results in a product that meets federal regulatory compliance standards for disposal. Presently preferred is the removal of the water to concentrate the metal ion solution by reverse osmosis through polymeric reverse osmosis membrane, preferably a high pressure high rejection polyamide thin membrane with a molecular cut off of approximately 50.

The preferred reverse osmosis unit was constructed by and purchased from Osmonics, Inc., utilizing an OSMON-ICS® Desal Membrane.

The metal ion solution is dried and the volatile metal ions are then grouted by a conventional method or as presently preferred, immobilized in a radiation shielding polymer which is the subject of the applicant's pending application Ser. No. 09/775,359. The applicant's polymer is a urethane-based composition, composite, or blend. The composition is formed by mixing a liquid isocyanate monomer and a liquid phenolic resin with a phosphate ester flame retardant at room temperature until a homogeneous mixture is formed. Presently preferred is 25 to 75% diphenylmethane 4,4'-diisocyanate monomer, with 40% most preferred, and 20 to 70% phenol formaldehyde resin with 53.85 to 54% most preferred. The presently preferred flame retardant is a halogenated phosphate ester, 3 to 10% with 6% most preferred. The resulting composition cures without heating in approximately 6–18 hours depending on environmental conditions.

A catalyst may be utilized in applications where a short curing time is necessary. Phenylpropyl pyridine, 0 to 1%, 0 to 0.15% most preferred, is presently used as a catalyst, reducing the composition cure time to about 20 minutes, depending on environmental conditions.

A ratio of 16% polymer to 84% volatile metal ion waste is presently preferred. The grouted waste is suitable for storage in an ERDF landfill.

The second temperature phase process reduces the total waste volume by about sixty-one percent, based on a typical tank waste composition.

Removal of Nitrates, Sulfur and Chromium

The temperature in the reaction vessel is then raised to a third temperature at which pyrolysis of the remaining waste, primarily heavy metal/transuranics, occurs. Pyrolysis results in the formation of gaseous nitrogen and sulfur oxides and chromium, and leaves a metal oxide ash residue. This residue includes all of the non-volatile constituents including substantial sodium salts. The gaseous components are removed from the reaction vessel for off gas treatment. Presently preferred is scrubbing the gas through sodium hydroxide, phosphoric acid and calcium chloride to produce sodium sulfate, ammonium phosphate, and calcium chromate, respectively, for disposal in an ERDF landfill.

Sample reactions for the step above follow:

$$2NO_2 + 14[H] \xrightarrow{C} 2NH_3 + 4H_2O$$

$$3NH_3 + H_3PO_4 \rightarrow (NH_4)_3PO_4 + 3H_2O$$

$$SO_4^{-2} \xrightarrow{R} SO_2 + H_2O + 2e-$$

$$2SO_2 + 2NaOH \rightarrow Na_2SO_4$$

$$Cr^{6+} \xrightarrow{R} CrO_2Cl_2 + H_2O + N_2$$

$$CrO_2Cl_2 + Ca(OH)_2 \rightarrow CaCrO_4 + 2HCl$$

C=Catalyst, R=Reagent=$N_2H_5Cl$

The third temperature phase of this process results in an additional twenty percent volume reduction of the tank waste. At this point, only about ⅙ to ⅐ of the original sludge mass and volume remain.

Removal of Transuranic Oxides

The metal oxide ash is then removed from the reaction vessel for treatment. The following procedure for producing products that meet federal regulatory compliance standards is presently preferred. The metal oxides are washed with water to remove all of the sodium and any water-soluble metal oxides, including sodium, strontium, technetium and cesium. While these components have fairly high solubility in water at room temperature, the temperature of the wash can be raised to insure dissolution. The LAW liquids decanted from the tanks or other storage areas before the waste was placed in the reaction vessel can be added to the wash solution for treatment.

The wash solution is centrifuged to remove any solids. Carbon dioxide is then bubbled through the clear liquid wash solution to precipitate the strontium as strontium carbonate, and a 1% hydrazine hydrate solution is added to reduce the technetium from $Tc^{+7}$ to $Tc^{+3}$. The wash solution is then decanted from the precipitate, and the precipitate is added to the removed solids and dried for disposal by vitrification. The clean oxides are mixed with stoichiometric quantities of boron and silicon dioxide to yield high quality borosilicate glass with excellent long-term durability and leaching characteristics. It is preferred to filter the solids from the wash prior to the addition of carbon dioxide, as any resultant change in pH may cause plutonium oxide to go into solution.

The decanted solution is then repeatedly diluted and subjected to reverse osmosis under 800 psi until the retentate is essentially sodium free, through a polymeric nanofiltration membrane. Presently preferred are three cycles of dilution/reverse osmosis, with the retentate being diluted by a factor of 9:1 deionized water to retentate for each cycle. The sodium is then recovered by drying the filtrate solution. The sodium is disposed of as sodium carbonate. In the alternative, the sodium can be vitrified into sodium aluminum silicate glass.

The retentate solution then flows through a column packed with a zeolite for ionexchange recovery of the cesium and technetium. Presently preferred is a combination of zeolite material including TSM-140 and clinoptilolite by Steelhead Specialty Minerals, Spokane, Washington and Zeolyst Intl., Valley Forge, Pa. Once the ion exchange is complete, or the zeolite material has been exhausted, the zeolite containing the metal ions is removed from the column and dried. The stream of sodium solution that is produced is dried for disposal. Two alternatives for disposal are currently preferred, the first being vitrification into sodium aluminum silicate glass, the second being on site disposal.

The dried, sodium free metal ions contained in the zeolite, plus the insoluble metal oxides and precipitate removed earlier is then mixed and melted with boron and silicon dioxide to fabricate borosilicate glass monoliths. The HLW sludge/solid fraction going to the melter has been significantly reduced to nearly 1/10 of its original mass and volume. It is currently anticipated that the 60–65%(by volume) liquid fraction undergoes a 90–95% volume/mass reduction due to the loss of water during processing. The corresponding 35–40%(by volume) solid fraction undergoes an 84% volume/mass reduction.

Figure 2:
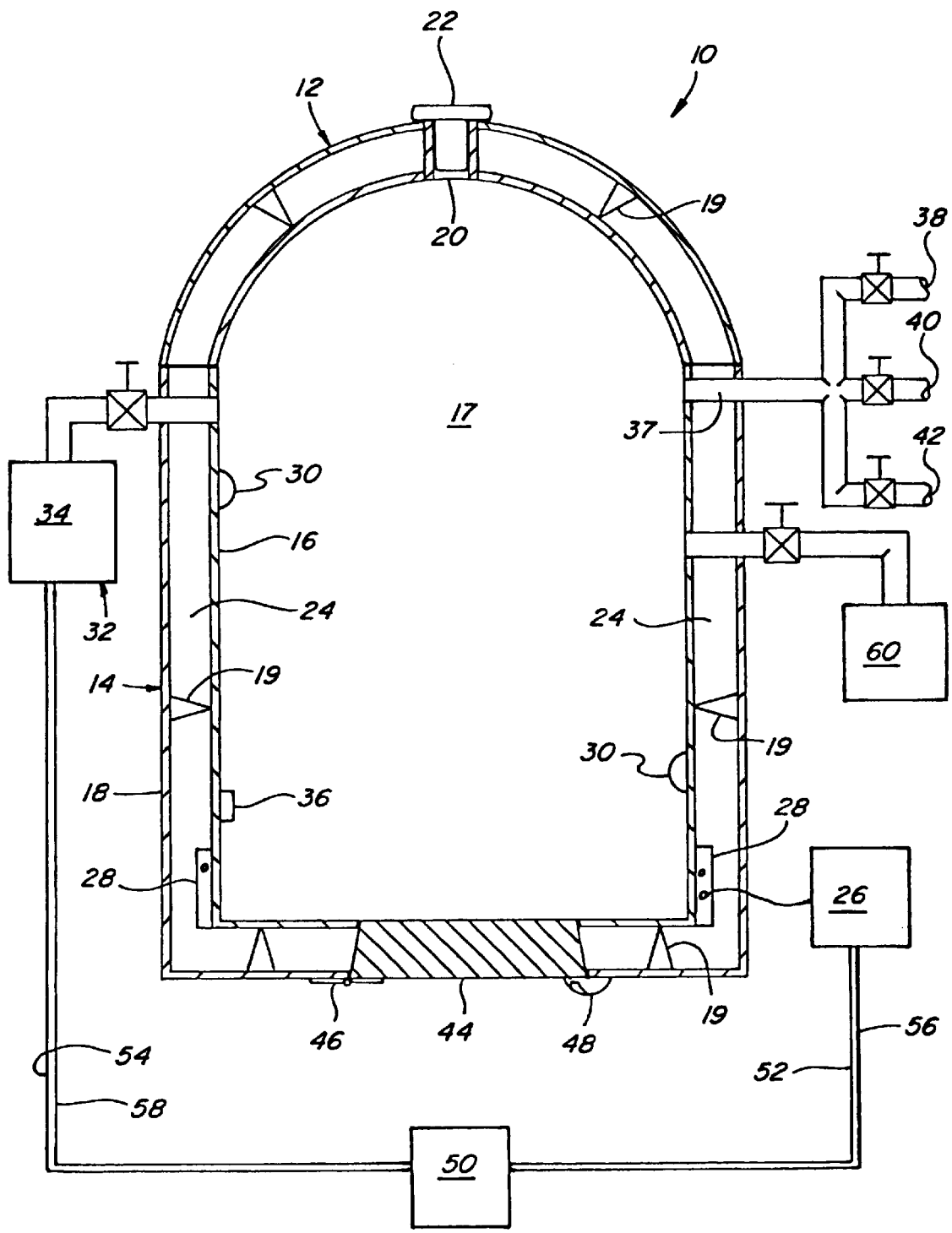
FIG. 2 is cross-sectional view of a preferred embodiment of the thermal desorption-type apparatus of the present invention.

Referring to FIG. 2, there is illustrated a preferred embodiment of a thermal desorptiontype unit 10 constructed of a suitable material such as stainless steel and shielded to prevent leakage of radiation. The unit 10 includes a lid portion 12 and a cylindrical body portion 14. The body portion 14 is a double walled reaction vessel including an inner liner 16 and an outer shell 18. The inner liner 16 and outer shell 18 are held in place relative to each other by support brackets 19 or any other suitable means to form a void 24 therebetween. The inner liner 16 defines the storage compartment 17 of the unit 10. The lid portion 12 includes an aperture or inlet 20 having a cover 22 to allow the radioactive waste to be introduced into the storage compartment 17 of the body portion 14.

The unit 10 further includes temperature control system 26 which is operatively connected to heating elements 28 located in the void 24, and temperature sensors 30 located adjacent the inner liner 16 within the compartment 17. The temperature control system 26 is capable of raising the temperature within the compartment 17 to any desired temperature between room temperature and pyrolysis temperatures.

A pressure control system 32 includes a vacuum pump 34 that is adapted to lower the pressure within the compartment 17 to about 0.1 atmosphere. The system 32 includes at least one pressure sensor 36 located within the compartment 17.

The body 14 further includes at least one gas outlet. In the presently preferred embodiment, an outlet 37 leads to three gas outlets 38, 40 and 42 as illustrated. These outlets correspond to three gaseous waste fractions that are typically generated by the method of the present invention. They include an outlet 38 for gaseous low boiling organic material, outlet 40 for gaseous volatile metals and outlet 42 for gaseous nitrogen oxides. In an alternative embodiment, the gaseous waste can all be removed through separate multiple outlets in the body 14, one outlet for gaseous low boiling organic material, one outlet for gaseous volatile metals, and one outlet for gaseous nitrogen oxides.

The body 14 also includes at least one solid waste outlet. In one preferred embodiment, a hinged portion 44 is attached to the lower portion of the body 14 by a hinge 46 and is kept closed during heating by latch 48. When opened, any metal oxide ash remaining after pyrolysis can be dumped and removed from the unit 10 for further processing Since thermal desorption is performed at a pre-determined and carefully controlled ramp of various combinations of temperatures and pressures, it is recognized and anticipated that the control of such temperatures and pressures within the unit 10 can be electronically controlled via appropriate means so as to automatically control the various temperatures and pressures from start to finish. Electronic control of the unit 10 can be accomplished in a wide variety of different ways such as by coupling an electronic controller or other computer or processing means 50 to the temperature control system 26 and the pressure control system 32, the controller 50 being capable of controlling and adjusting the various temperatures and pressures within the unit 10 for completing the process. Electronic controllers such as the controller 50 are commonly used in association with a wide variety of different types of devices for accomplishing various tasks. In this regard, controller 50 may include processing means such as a microcontroller or microprocessor, associated electronic circuitry such as input/output circuitry, analog circuits and/or programmed logic arrays, as well as associated memory. Controller 50 can therefore be programmed to sense and recognize the appropriate signals indicative of the various conditions and states associated with unit 10 such as signals from sensors 30 and 36 indicative of the temperatures and pressures inside the compartment 17. In this regard, controller 50 could be operatively connected via conductive paths 52 and 54 for receiving input signals from temperature control system 26 and pressure control system 32 such as from the respective temperature and pressure sensors associated therewith. Based upon input signals 52 and 54, controller 50 would be configured to output appropriate signals such as output signals 56 and 58 to the appropriate control mechanisms such as control systems 26 and 32 to accurately control and change the temperatures and pressures associated with unit 10 during the thermal desorption process. Based upon the various parameters inputted to controller 50, appropriate calibration tables, charts, maps and other data can be stored or programmed within the memory of controller 50 so as to control and/or change the temperature, pressure and other selected parameters associated with compartment 17 so as to achieve the stated goals and objectives of the remediation process. Still other control systems for accomplishing the above-described processes can be utilized without the departing from the spirit and scope of the present invention.

The unit 10 also includes a gas purging or venting system 60 operatively connected to the unit 10 in a known manner to allow for the removal of ambient air from the compartment 17 and the introduction of an inert gas atmosphere therewithin. The system 60 functions to flush the compartment 17 with an inert gas to provide the inert atmosphere. Although argon or helium is generally preferred, any suitable inert gas may be utilized. Once the inert gas atmosphere is established, the pressure within compartment 17 is then reduced, preferably to about 0.1 atm as previously described. The inert atmosphere in combination with the reduced pressure act to limit or eliminate explosive reactions of the waste within compartment 17 as the temperature is raised therewithin to accomplish the present remediation process.

EXAMPLE 1

LAW and HLW simulants were prepared according to the procedure provided by the Tank Focus Group as approved by the Department of Energy (DOE) for use in each of the following examples. The simulants were thoroughly mixed for several hours using magnetic stirrers and let stand overnight. Both simulants yielded about 60–65% by volume clear solutions and about 40–35% by volume heavier sludge.

The clear liquids from both simulants were decanted, filtered through a Buchner funnel and stored. The clear decanted liquids and the remaining solids/sludge were chemically analyzed after proper acid digestion procedures and by Atomic Absorption/inductively Coupled Plasma (AA/ICP) techniques to verify the simulant components.

Aliquots of the clear liquid samples were dried at 105° C. overnight. The volume decrease, due to loss of water, was determined to be about 90–95%.

The samples were then subjected to pyrolysis at about 900° C., at ambient pressure. The samples were cooled and the remaining ash was evaluated to determine volume reduction. The results are shown in Tables 1 and 2 which are set forth in FIGS. 3 and 4.

EXAMPLE 2

Reverse Osmosis/Diafiltration Method for the Removal of Sodium

An aliquot of the clear LAW solution was subjected to reverse osmosis through a high rejection polyamide thin membrane, OSMONICS® Desal Membrane by Osmonics, Inc. under 800 psi. The retentate was then diluted 9:1 deionized water to retentate, and the reverse osmosis repeated. A third cycle of reverse osmosis/dilution resulted in a retentate solution in which sodium was not detected. The sodium solution (the filtrate) was evaporated in a glass tray using an infrared heat source. The sodium residue was weighed and its specific gravity was determined to be 2.130 gms/cc, confirming purity of the sodium.

The solution containing the cesium and strontium was evaporated to dryness, the residue weighed and grouted with the applicant's polymer composition. The resulting monoliths were subjected to ANS 16.1 leaching tests. The results can be seen in Table 3 which is set forth in FIG. 5.

EXAMPLE 3

Zeolite Method for Removal of Cesium and Strontium

An aliquot of the clear LAW filtrate was subjected to the reverse osmosis/diafiltration method described above until no sodium was detected in the retentate solution. The sodium free solution was then subjected to ion exchange using a column packed with natural and synthetic zeolites. The zeolites quantitatively exchanged sodium ions for every equivalent of cesium and strontium ions. The zeolites utilized were clinoptilolite by Steelhead Specialty Minerals, Spokane, Washington, and Zeolyst Intl., Valley Forge, Pa. The column heights were 5 inches with a 1.5 inch diameter. The flow rate was 2 ml/min. The solution was passed through a second identical column and the effluent saline solution was tested for cesium and strontium. The saline solution was then evaporated to dryness.

The zeolite column packing was removed, dried, and grouted 84:16 waste to polymer with applicant's polymer composite. The grout was cured in a cylindrical mold for 18 hours, and then was subjected to ANS 16.1 leaching tests for 28 days. The results can be seen in Table 4 which is set forth in FIG. 6. The volume reduction from the clear liquids to the polymer grout was on the order of 60–90%.

EXAMPLE 4

The solid residue from the LAW waste was washed several times with water to remove sodium from the residue, and the residue centrifuged. The centrifugate was analyzed by AA to verify sodium was removed from the residue. A known quantity of the sodium free sludge was subjected to thermal desorption followed by pyrolysis. Two samples were taken from the ash residue and made into a polymer based grout and several grams of borosilicate glass. The glass monoliths were generated by heating the oxide residue with stoichiometric amounts of boron and silicon dioxide in an appropriate crucible in an electric furnace around 1,600 to 1700° C. to form cylindrically shaped monoliths, 3 cm in height, 1 cm in diameter. in an electrical furnace around 1800° C. Both samples were subjected to ANS 16.1 leaching tests. The results can be seen in Tables 5 and 6 which are set forth in FIGS. 7 and 8.

EXAMPLE 5

The HLW simulant was also separated as clear liquid and heavy sludge and were subjected to similar evaluation as that of the LAW simulant. The results can be seen in Tables 7 through 9 which are set forth in FIGS. 9–11.

From the foregoing description, those skilled in the art will appreciate that all the objects of the present invention are realized. A radioactive waste remediation method that results in a significant reduction in the total volume/mass of waste is provided. The volume/mass reduction that ranges from about 75.5% to 84.7% greatly reduces disposal and storage costs.

There is further provided a method that allows the waste to be pumped straight from an underground waste tank or other storage areas without costly and time consuming pretreatment steps, thereby reducing costs while limiting handling and employee exposure. In addition, the method of the present invention provides a simplified and streamlined process that provides improved separation while being easily adapted to handle variations in tank waste. Finally an apparatus that is especially well suited to perform the method of the present invention is disclosed.

While specific embodiments have been shown and described, many variations are possible. Most importantly, while the preferred embodiment is described as it relates to tank waste, this method is applicable to any multi-component waste product, radioactive or not. While a preferred embodiment of the waste remediation method of the present invention is described in relation to the thermal desorption-type apparatus illustrated in FIG. 2, the method is not limited to the apparatus disclosed and claimed herein. The steps of the present method may be accomplished in any suitable reaction vessel, or the steps may be accomplished in more than one reaction vessel.

In addition, the off-gas treatments described, while presently preferred, are not meant to be limiting. Any suitable off-gas treatment may be utilized.

Thus there have been shown and described embodiments of a method and apparatus for remediating radioactive waste, which method and apparatus fulfill all of the objects and advantages sought therefore. As evident from the foregoing description, certain aspects of the present invention are not limited by the particular details of the examples illustrated herein, and it is therefore contemplated that many changes, modifications, variations and other uses and applications of the present invention, including equivalents thereof, will become apparent to those skilled in the art after considering this specification and the accompanying figures. All such changes, modifications, variations and other uses and applications which do not depart from the spirit and scope of the invention are deemed to be covered by the invention which is limited only by the claims which follow.

What is claimed is:

1. A method for remediating non-homogeneous radioactive waste, wherein the waste contains low boiling temperature/high vapor pressure components and heavy metal/transuranic components, the method comprising:

isolating the waste in a reaction vessel;

providing an inert atmosphere within the reaction vessel;

reducing the pressure within the reaction vessel;

raising the temperature within the reaction vessel to a temperature necessary to vaporize the low boiling temperature/high vapor pressure components to form a gaseous waste portion;

removing the gaseous waste portion from the reaction vessel;

treating the gaseous waste portion for disposal;

raising the temperature within the reaction vessel to a temperature necessary to cause pyrolysis of the heavy metal/transuranic components to form gaseous nitrogen oxides and solid metal oxide ash;

treating the gaseous metal oxides for disposal;

separating the solid metal oxide ash into a sodium containing fraction and a sodium free fraction; and remediating the sodium fraction and the sodium free fraction for storage.

2. The method of claim 1 wherein the reaction vessel is shielded to prevent leakage of radioactivity.

3. A method for treating non-homogeneous radioactive waste, wherein the waste contains an aqueous portion and a solid/sludge portion, the solid/sludge portion contains low boiling organic components, volatile metal components, and heavy metal/transuranic components, the method comprising:

decanting the aqueous portion from the solid/sludge portion;

remediating the aqueous portion for disposal;

isolating the solid/sludge portion in a reaction vessel;

providing an inert atmosphere within the reaction vessel;

reducing the pressure within the reaction vessel;

raising the temperature within the reaction vessel to a first temperature at which the low boiling organic components are converted to a gaseous state;

maintaining the first temperature until essentially all the low boiling organic components are converted to a gaseous state;

removing the gaseous low boiling organic components from the reaction vessel;

remediating the gaseous low boiling organic components for disposal;

raising the temperature within the reaction vessel to a second temperature at which the volatile metal components are converted to a gaseous state;

maintaining the second temperature until essentially all the volatile metal components are converted to a gaseous state;

removing the gaseous volatile metal components;

remediating the gaseous volatile metal components for disposal;

raising the temperature within the reaction vessel to a third temperature at which pyrolysis of the heavy metal/transuranic components occurs;

maintaining the third temperature until the heavy metal/transuranic components are converted to gaseous nitrogen oxides and solid metal oxide ash, wherein the metal oxide ash contains water soluble metal oxide components and water insoluble metal oxide components;

removing the gaseous nitrogen oxides from the reaction vessel;

remediating the gaseous nitrogen oxides for disposal;

removing the metal oxide ash from the reaction vessel;

separating the metal oxide ash into at least two fractions, at least one fraction being essentially sodium and at least one fraction being essentially sodium free;

remediating the at least one sodium fraction for disposal; and remediating the at least one sodium free fraction for disposal.

4. The method of claim 3 wherein the remediation of the at least one sodium fraction comprises vitrifying the sodium fraction into sodium aluminum silicate glass.

5. The method of claim 3 wherein the remediation of the at least one sodium free fraction comprises vitrifying the sodium free fraction into borosilicate glass.

6. The method of claim 3 further including shielding the reaction vessel to prevent leakage of radiation from the reaction vessel.

7. The method of claim 3 wherein remediating the gaseous organic components comprises:

catalytically oxidizing the gaseous low boiling organic components to form carbon dioxide and hydrogen halides; and scrubbing the carbon dioxide and hydrogen halides through sodium hydroxide to form sodium halide and sodium carbonate.

8. The method of claim 3 wherein remediating the gaseous volatile metal components comprises:

scrubbing the gaseous volatile metal components through water to create a metal ion solution;

concentrating the metal ion solution by reverse osmosis of the metal ion solution through a membrane; and immobilizing the concentrated metal ion solution in a radiation shielding polymer matrix.

9. The method of claim 8 wherein the reverse osmosis membrane is a polymeric membrane having a molecular weight cut off of about 50.

10. The method of claim 8 wherein the radiation shielding polymer matrix comprises:

about 25 to 75% at least one aromatic isocyanate monomer;

about 20 to 70% at least one phenolic resin, the phenolic resin being produced by polycondensation of a phenol compound with formaldehyde;

about 3 to 10% at least one halogenated phosphate ester flame retardant; and about 0 to 1.0% at least one catalyst.

11. The method of claim 8 wherein the radiation shielding polymer matrix comprises;

about 40% diphenylmethane 4,4'-diisocyanate;

about 53.85 to 54% phenolic resin, the phenolic resin being produced by polycondensation of phenol with formaldehyde;

about 6% halogenated phosphate ester retardant; and about 0 to 0.15% phenypropyl pyridine.

12. The method of claim 3 wherein the remediation of the gaseous nitrogen oxides comprises:

reducing the nitrogen oxides to ammonia; and scrubbing the ammonia through phosphoric acid to form ammonium phosphate.

13. The method of claim 3 wherein the remediation of the metal oxide ash comprises:

washing the metal oxide ash with water to form a metal ion solution of the water soluble metal oxide components, wherein the water soluble metal oxide components contain sodium, strontium, technetium and cesium;

filtering the metal ion solution to remove the water insoluble metal oxide components;

bubbling carbon dioxide through the filtered metal ion solution to form strontium carbonate precipitate;

adding hydrazine hydrate to the metal ion solution to reduce the technetium;

decanting the metal ion solution from the precipitate;

adding the precipitate to the water insoluble metal oxide components;

drying the precipitate and water insoluble metal oxide components;

diluting the metal ion solution with water;

removing the sodium from the diluted metal ion solution by reverse osmosis through a membrane, whereby the sodium is removed from a retentate solution and added to a filtrate solution;

repeating the diluting and removing steps until the retentate solution is essentially sodium free;

drying the filtrate solution to recover the sodium;

vitrifying the sodium to produce sodium aluminum silicate glass;

removing metal ions from the retentate solution by running the retentate solution through an ion exchange medium, whereby the metal ions are retained by the ion exchange medium;

drying the ion exchange medium; and vitrifying the ion exchange medium and the water insoluble metal oxide components into borosilicate glass.

14. The method of claim 13 wherein the reverse osmosis membrane is a polymeric nanofiltration membrane.

15. A method for treating non-homogeneous radioactive waste, wherein the waste contains an aqueous portion and a solid/sludge portion, the solid/sludge portion contains low boiling organic components, volatile metal components, and heavy metal/transuranic components, the method comprising:

decanting the aqueous portion from the solid/sludge portion;

isolating the solid/sludge portion in a reaction vessel;

flushing the reaction vessel with an inert gas;

reducing the pressure within the reaction vessel;

raising the temperature within the reaction vessel to a first temperature at which the low boiling organic components are converted to a gaseous stage;

maintaining the first temperature until essentially all the low boiling organic components are converted to a gaseous state;

removing the gaseous organic components from the reaction vessel;

catalytically oxidizing the gaseous organic components to form carbon dioxide and hydrogen halides;

scrubbing the carbon dioxide and hydrogen halides through sodium hydroxide to form sodium halide and sodium carbonate;

raising the temperature within the reaction vessel to a second temperature at which the volatile metal components are converted to a gaseous state;

maintaining the second temperature until essentially all the volatile metal components are converted to a gaseous state;

removing the gaseous volatile metal components from the reaction vessel;

scrubbing the gaseous volatile metal components through water to create a volatile metal ion solution;

concentrating the volatile metal ion solution by reverse osmosis of the volatile metal ion solution through a first membrane;

immobilizing the concentrated volatile metal ion solution in a radiation shielding polymer;

raising the temperature within the reaction vessel to a third temperature at which pyrolysis of the heavy metal/transuranic components occurs;

maintaining the third temperature until the heavy metal/transuranic components are converted to gaseous nitrogen oxides and solid metal oxide ash, wherein the metal oxide ash contains water soluble metal oxide components and water insoluble metal oxide components;

removing the gaseous nitrogen oxides from the reaction vessel;

reducing the nitrogen oxides to ammonia;

scrubbing the ammonia through phosphoric acid to form ammonium phosphate;

removing the solid metal oxide ash from the reaction vessel;

washing the metal oxide ash with water to form a heavy metal ion solution of the water soluble metal oxide components, wherein the water soluble metal oxide components contain sodium, strontium, technetium and cesium;

adding the decanted aqueous portion to the heavy metal ion solution;

bubbling carbon dioxide through the heavy metal ion solution to precipitate the strontium as strontium carbonate;

adding hydrazine hydrate to the heavy metal ion solution to reduce the technetium;

decanting the heavy metal ion solution from the water insoluble metal oxide components;

drying the water insoluble metal oxide components;

diluting the heavy metal ion solution with water;

removing the sodium from the diluted heavy metal ion solution by reverse osmosis through a second membrane, whereby the sodium is removed from a retentate solution and added to a filtrate solution;

repeating the diluting and removing steps until the retentate solution is essentially sodium free;

drying the filtrate solution to recover the sodium;

vitrifying the sodium to produce sodium aluminum silicate glass;

removing metal ions from the retentate solution by running the retentate solution through an ion exchange medium, whereby the metal ions are retained by the ion exchange medium;

drying the ion exchange medium; and vitrifying the ion exchange medium and the water insoluble metal oxide components into borosilicate glass.

16. The method of claim 15 wherein the inert gas is selected from the group consisting of helium, neon, and argon.

17. The method of claim 15 wherein the pressure is reduced to about 0.1 atmospheres.

18. The method of claim 15 wherein the first temperature is about 30 to 40° C. at 0.1 atmospheres.

19. The method of claim 15 wherein the second temperature is about 60 to 70° C. at 0.1 atmospheres.

20. The method of claim 15 wherein the third temperature is about 200 to 300° C. at 0.1 atmospheres.

21. The method of claim 15 wherein the first reverse osmosis membrane is a polymeric membrane having a molecular weight cut off of about 50.

22. The method of claim 15 wherein the second reverse osmosis membrane is a polymeric nanofiltration membrane.

23. The method of claim 15 wherein the ion exchange medium is at least one zeolite.

24. The method of claim 15 wherein the radiation shielding polymer comprises:
    about 25 to 75% at least one aromatic isocyanate monomer;
    about 20 to 70% at least one phenolic resin, the phenolic resin being produced by polycondensation of a phenol compound with formaldehyde;
    about 3 to 10% at least one halogenated phosphate ester flame retardant; and
    about 0 to 1.0% at least one catalyst.

25. The method of claim 15 wherein the radiation shielding polymer comprises;
    about 40% diphenylmethane 4,4'-diisocyanate;
    about 53.85 to 54% phenolic resin, the phenolic resin being produced by polycondensation of phenol with formaldehyde;
    about 6% halogenated phosphate ester retardant; and
    about 0 to 0.15% phenypropyl pyridine.

26. A method for treating non-homogeneous radioactive waste, wherein the waste contains heavy metal/transuranic components, the method comprising:
    pyrolyzing the waste, whereby the heavy metal/transuranic components are converted to gaseous nitrogen oxides and solid metal oxide ash, wherein the metal oxide ash contains water soluble metal oxide components and water insoluble metal oxide components;
    removing the gaseous nitrogen oxides from the reaction vessel;
    remediating the gaseous nitrogen oxides for disposal; and
    separating the metal oxide ash into at least two fractions, at least one fraction being essentially sodium, and at least one fraction being essentially sodium free;
    remediating the sodium fraction and the sodium free fraction for storage.

27. The method of claim 26 wherein the remediation of the gaseous nitrogen oxides comprises:
    reducing the nitrogen oxides to ammonia; and
    scrubbing the ammonia through phosphoric acid to form ammonium phosphate.

28. The method of claim 26 wherein the separation of the metal oxide ash comprises:
    washing the metal oxide ash with water to form a metal ion solution of the water soluble metal oxide components, wherein the water soluble metal oxide components contain sodium, strontium, technetium and cesium;
    filtering the metal ion solution to remove the water insoluble metal oxide components;
    bubbling carbon dioxide through the metal ion solution to form strontium carbonate precipitate;
    adding hydrazine hydrate to the metal ion solution to reduce the technetium;
    decanting the metal ion solution from the precipitate;
    adding the precipitate to the water insoluble metal oxide components;
    drying the water insoluble metal oxide components;
    diluting the decanted metal ion solution with water;
    removing the sodium from the diluted metal ion solution by reverse osmosis through a membrane, whereby the sodium is removed from a retentate solution and added to a filtrate solution;
    repeating the diluting and removing steps until the retentate solution is essentially sodium free;
    drying the filtrate solution to recover the sodium;
    vitrifying the sodium to produce sodium aluminum silicate glass;
    removing metal ions from the retentate solution by running the retentate solution through an ion exchange medium, whereby the metal ions are retained by the ion exchange medium;
    drying the ion exchange medium; and
    vitrifying the ion exchange medium and the water insoluble metal oxide components into borosilicate glass.

29. The method of claim 26 wherein the reverse osmosis membrane is a polymeric nanofiltration membrane.

30. A method for treating non-homogeneous radioactive waste, wherein the waste contains heavy metal/transuranic components, the method comprising:
    pyrolyzing the waste, whereby the heavy metal/transuranic components are converted to gaseous nitrogen oxides and solid metal oxide ash, wherein the metal oxide ash contains water soluble metal oxide components and water insoluble metal oxide components;
    removing the gaseous nitrogen oxides from the reaction vessel;
    reducing the nitrogen oxides to ammonia;
    scrubbing the ammonia through phosphoric acid to form ammonium phosphate;
    removing the solid metal oxide ash from the reaction vessel;
    washing the metal oxide ash with water to form a metal ion solution of the water soluble metal oxide components, wherein the water soluble metal oxide components contain sodium, strontium, technetium and cesium;
    filtering the metal ion solution to remove the water insoluble metal oxide components;
    bubbling carbon dioxide through the filtered metal ion solution to form strontium carbonate precipitate;
    adding hydrazine hydrate to the metal ion solution to reduce the technetium;
    decanting the metal ion solution from the precipitate;
    adding the precipitate to the water insoluble metal oxide components;
    drying the water soluble metal oxide components;
    diluting the metal ion solution with water;
    removing the sodium from the diluted metal ion solution by reverse osmosis through a membrane, whereby the sodium is removed from a retentate solution and added to a filtrate solution;

repeating the diluting and removing steps until the retentate solution is essentially sodium free;

drying the filtrate solution to recover the sodium;

vitrifying the sodium to produce sodium aluminum silicate glass;

removing metal ions from the retentate solution by running the retentate solution through an ion exchange medium, whereby the metal ions are retained by the ion exchange medium;

drying the ion exchange medium; and vitrifying the ion exchange medium and the water insoluble metal oxide components into borosilicate glass.

31. The method of claim 30 wherein the reverse osmosis membrane is a polymeric nanofiltration membrane.

32. The method of claim 30 wherein the ion exchange medium is at least one zeolite.

* * * * *

UNITED STATES PATENT AND TRADEMARK OFFICE
CERTIFICATE OF CORRECTION

Figure 1A:
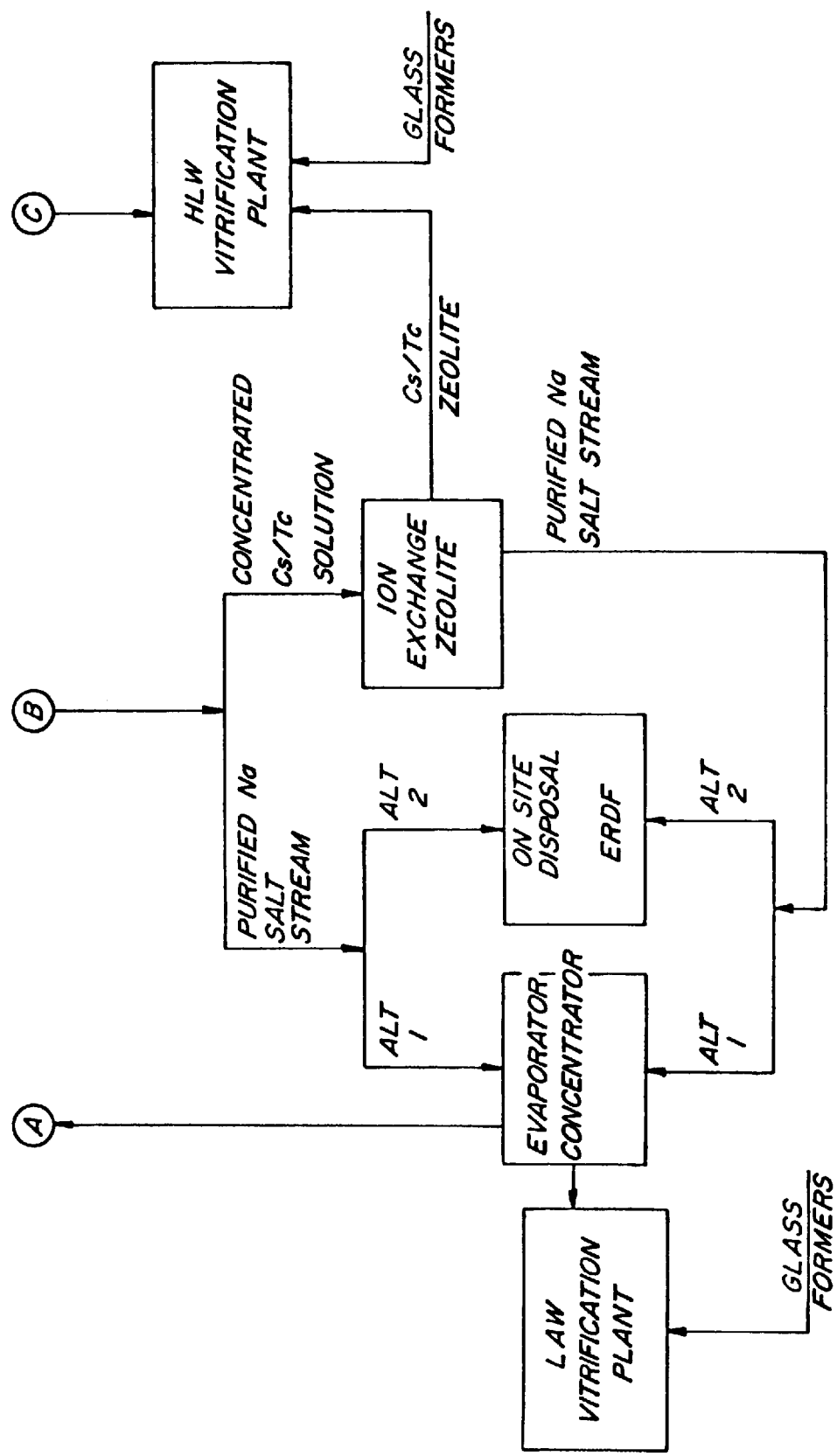

PATENT NO. : 6,518,477 B2  
DATED : February 11, 2003  
INVENTOR(S) : Rengarajan Soundararajan It is certified that error appears in the above-identified patent and that said Letters Patent is hereby corrected as shown below:

Column 4,  
Line 10, before the word "Cesium", insert -- From --.  
Line 25, after the word "in", delete "FIG. 1" and insert -- FIGS. 1 and 1A --.

Column 6,  
Line 67, before the word "for", delete "ion exchange", and insert -- ion-exchange --.

Column 7,  
Line 23, before the word "thermal", delete "desorption type" and insert -- desorption-type --.

Column 9,  
Line 5, after the word "Absorption/", delete "inductively" and insert -- Inductively --.

Signed and Sealed this

Twenty-second Day of July, 2003

JAMES E. ROGAN  
*Director of the United States Patent and Trademark Office*